July 31, 1934. J. C. CURTIS 1,968,379
THROTTLE VALVE AND MOTIVE FLUID CONNECTION FOR FLUID ACTUATED MACHINES
Filed Aug. 13, 1932

JOHN C. CURTIS
INVENTOR

BY John E. Renfer
ATTORNEY

Patented July 31, 1934

1,968,379

UNITED STATES PATENT OFFICE 1,968,379

THROTTLE VALVE AND MOTIVE FLUID CONNECTION FOR FLUID ACTUATED MACHINES

John C. Curtis, Cleveland, Ohio

Application August 13, 1932, Serial No. 628,728

7 Claims. (Cl. 251—152)

This invention pertains broadly to fluid actuated machines but more particularly to the construction of throttle valve and motive connection therefor.

One object of this invention is to produce a throttle valve and a motive fluid connection of a simple design affording a compact assembly.

Another object of this invention is to produce a throttle valve with a handle secured thereto in such a manner as to prevent its accidental removal from the throttle valve, affording thereby a rigid assembly.

Another object of this invention is to produce a throttle with positive stops for limiting the travel of its rotary movement.

Other objects and advantages more or less ancillary to the foregoing and the manner in which the various objects are attained, reside in the specific construction an aggroupment of the elements peculiar to this structure, as will become apparent from a more complete examination of this specification, in the claims of which there are assembled certain specific combinations of parts and specific constructions indicative of the scope and spirit of the invention.

In the drawing which illustrates a preferred embodiment of the invention:

Figure 1:
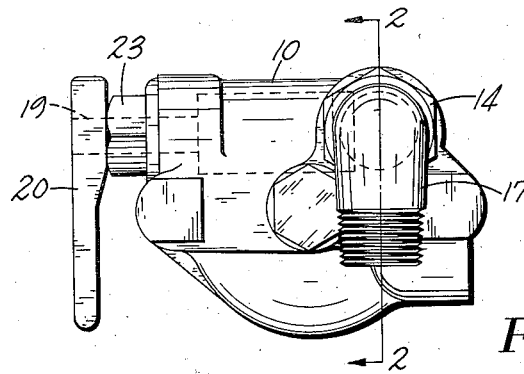
Fig. 1 is an elevational view of the backhead of a fluid actuated machine embodying the invention.
Figure 2:
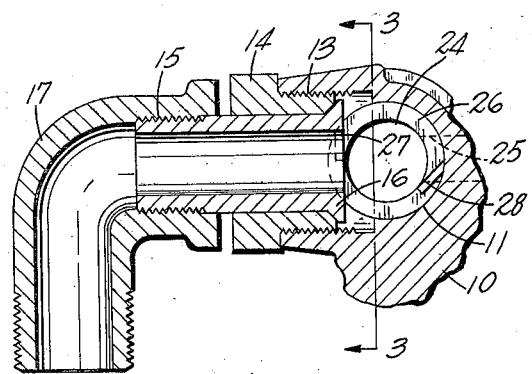
Fig. 2 is a cross sectional view taken in a plane indicated by line 2—2 in Fig. 1.

Referring to the drawing, in which like symbols designate corresponding parts throughout the several views, there is shown a housing 10 formed with a bore or valve chamber 11 terminated by a screw threaded portion 12. Opening into the bottom end of the valve chamber 11 and at right angles therewith, there is a screw threaded bore 13 capable to receive, in screw tight engagement therewith, a nut 14. This nut is accurately machined to rotatably receive a nipple 15 formed with a tapered head 16 capable of fluid tight engagement with the nut 14. Secured to the nipple 15 in screw tight engagement therewith, there is an elbow 17 to which may be secured the end of any fluid conduit. The nipple 15 and elbow 17 are provided with a bore forming a suitable passage to convey the pressure fluid into the valve chamber 11.

Rotatably mounted within the valve chamber 11 in fluid tight relation with the wall thereof, there is a throttle valve 18 formed with a stem 19, which projects outside of the housing 10. The stem 19 is accurately machined to receive, in pressed fit engagement therewith, a handle 20. To afford sufficient engaging surface with the stem 19, the handle 20 is provided with an integral cylindrical portion or shell 21. The handle 20 is permanently and integrally attached to the stem 19 by a weld 22. Rotatably mounted on the shell 21, and interposed between the throttle valve 18 and its handle 20, there is a nut 23, which is introduced on the shell 21 previous to the assembly of the handle 20 with the stem 19. When the throttle valve is introduced into the valve chamber 11, the nut 23 is capable of screw tight engagement with the valve chamber screw threaded portion 12, thus preventing the accidental removal of the throttle valve from its chamber, and affording an efficient bearing for the handle shell 21 to maintain the stem 19 in axial alignment with the valve chamber 11. The throttle valve 18 is provided with an enlarged bore 24 capable of constant communication with the bottom of the bore 13. Radially disposed through the throttle valve and opening into the bore 24, there may be a plurality of passages similar to the passage 25, through which pressure fluid may be admitted into the different parts of the machine with which the throttle valve may be associated. Adjacent to the bore 13, the throttle valve 18 is provided with a cut away portion constituting, with the diametrically opposed uncut portion of the throttle valve, a lug 26 defined by the stepped side walls 27 and 28. The bore 13 is located in such a manner as to permit the head 16 of the nipple 15, and the end of the nut 14, to overlap the end of the throttle valve 18 a distance equal to or somewhat smaller than the length of the lug 26. The end of the head 16 and the end of the nut 14 are located in the bore 13 below the outside wall of the throttle valve 18. By the location of these parts, the stepped side walls 27 and 28, of the lug 26, are capable of engagement with the end of the nipple's head 16, and the end of the nut 14, to limit the rotary movement of the throttle valve when the latter is rotated into a closed or opened position.

Figure 5:
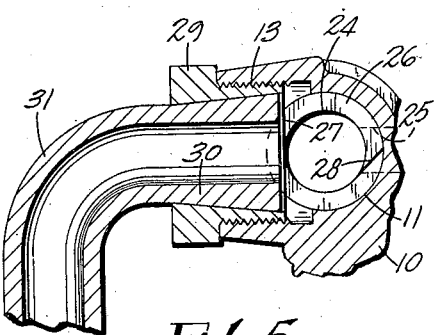
Fig. 5 is a view similar to Fig. 2 illustrating a modification of the invention.
Figure 3:
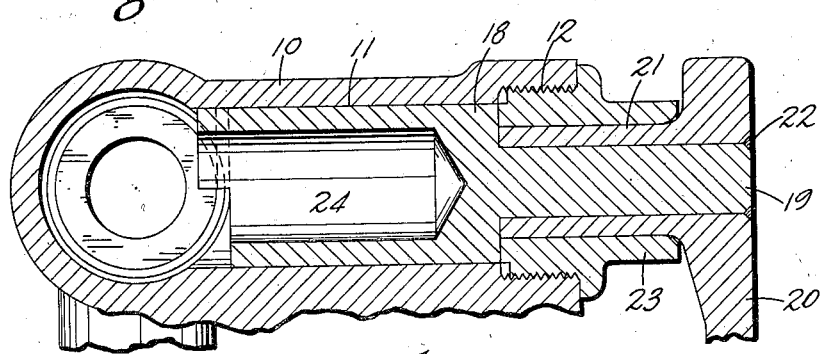
Fig. 3 is an enlarged longitudinal cross sectional view taken in a plane indicated by line 3—3 in Fig. 2.
Figure 4:
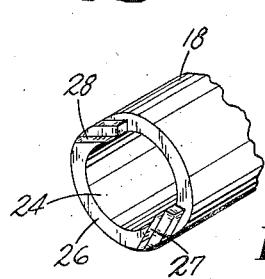
Fig. 4 is a perspective view of a portion of the throttle valve.

In Fig. 5 there is shown a modification of the invention in which the nut 29 is accurately machined to receive the enlarged tapered head 30 of a pressure fluid connection elbow 31. The end of the head 30 is located somewhat below the end of the nut 29, thus permitting the engagement of the front end of the nut 29 with the side walls 27 and 28 of the lug 26.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In a fluid controlling device, a housing formed with a valve chamber having a valve rotatable therein, rotatable pressure fluid conveying means within said housing for admitting pressure fluid into said chamber to be controlled by said valve, and means on said valve engageable with said conveying means for limiting the rotary movement of said valve.

2. In a fluid controlling device, a housing formed with a valve chamber having a valve rotatable therein, a pressure fluid conveying conduit rotatably secured to said housing for admitting pressure fluid into said valve to be controlled thereby, a securing member for said conduit capable of fluid tight engagement therewith, and means on said valve engageable with one extreme end face of said securing member for limiting the rotary movement of said valve.

3. In a fluid controlling device, a housing formed with a valve chamber having a valve rotatable therein, a rotatable pressure fluid conveying member within said housing for admitting pressure fluid into said chamber to be controlled by said valve, and means integral with said valve and projecting therefrom capable of engagement with said fluid conveying member for limiting the rotary movement of said valve.

4. In a fluid controlling device, a housing formed with a valve chamber having a valve rotatable therein, a pressure fluid conveying member for admitting pressure fluid into said valve to be controlled thereby, said member being secured to said housing at substantially right angles from the axis of said valve and overlapping the end thereof, and means constituting one end portion of said valve capable of engagement with the end of said member for limiting the rotary movement of said valve.

5. In a fluid controlling device, a housing formed with a valve chamber having a valve rotatable therein, a pressure fluid conveying member for admitting pressure fluid into said valve to be controlled thereby, a nut for securing said member to said housing at substantially right angles from the axis of said valve, and means on the end of said valve capable of engagement with the end of said nut for limiting the rotary movement of said valve.

6. In a fluid controlling device, a housing formed with a valve chamber having a valve rotatable therein, a bore within said housing in communication with said chamber, a stationary and rotatable member disposed within said bore, said rotatable member being capable of conveying pressure fluid into said chamber through said bore, and means integral with said valve engageable with said stationary and rotatable members to limit the rotary movement of said valve.

7. In a fluid controlling device, a housing formed with a valve chamber having a valve rotatable therein, a rotatable pressure fluid conveying member within said housing for admitting pressure into said chamber to be controlled by said valve, and means on said valve engageable with one extreme end face of said member for limiting the rotary movement of said valve.

JOHN C. CURTIS.